United States Patent

Thibodeau, Sr.

[15] 3,707,238
[45] Dec. 26, 1972

[54] PRIME MOVER
[72] Inventor: John L. Thibodeau, Sr., 8402 12th Street, Tampa, Fla. 33602
[22] Filed: Sept. 2, 1970
[21] Appl. No.: 68,890

[52] U.S. Cl. ................................................214/390
[51] Int. Cl. ..............................................B60p 1/64
[58] Field of Search............................214/390, 392

[56] References Cited

UNITED STATES PATENTS

| | | | |
|---|---|---|---|
| 1,849,854 | 3/1932 | Stuebing | 214/392 |
| 2,822,944 | 2/1958 | Blomgren | 214/390 |
| 2,897,989 | 8/1959 | Hounsell | 214/390 |

Primary Examiner—Albert J. Makay
Attorney—Stefan M. Stein

[57] ABSTRACT

A vehicle primarily designed to transport a large load, such as a modular home. The vehicle comprises a substantially U-shaped frame to partially enclose the load and load engaging means movably connected to the frame in such a manner as to enable adjustment in a horizontal direction to correspond to the specific size of the load and to enable movement in a vertical direction to lift the load.

7 Claims, 11 Drawing Figures

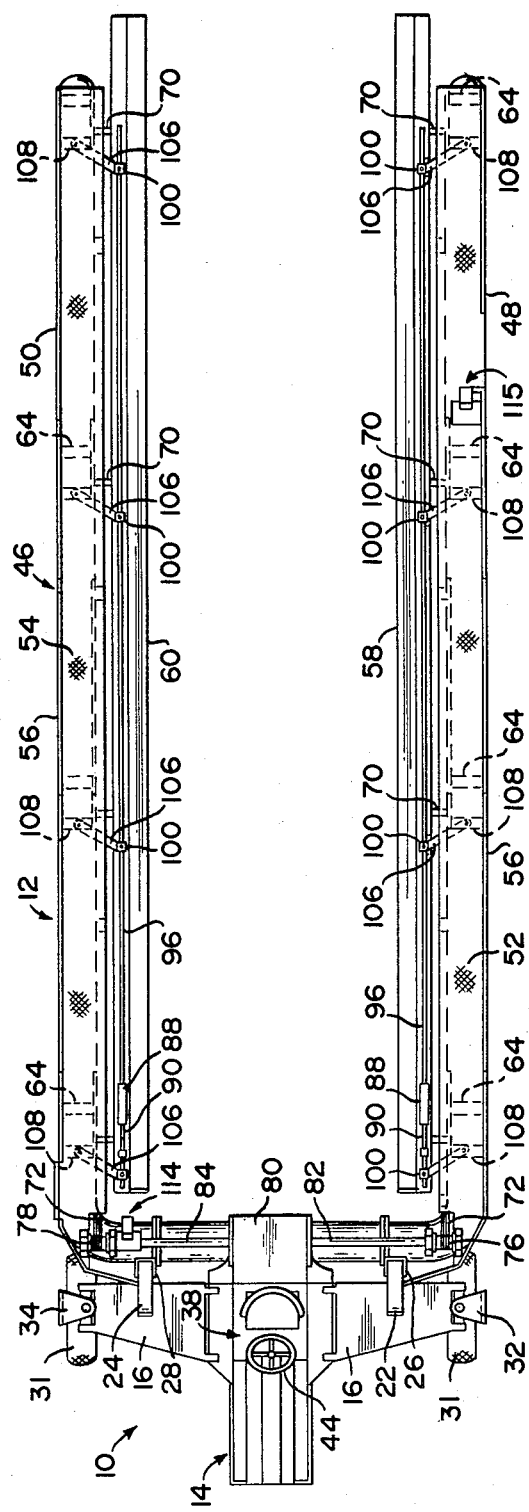

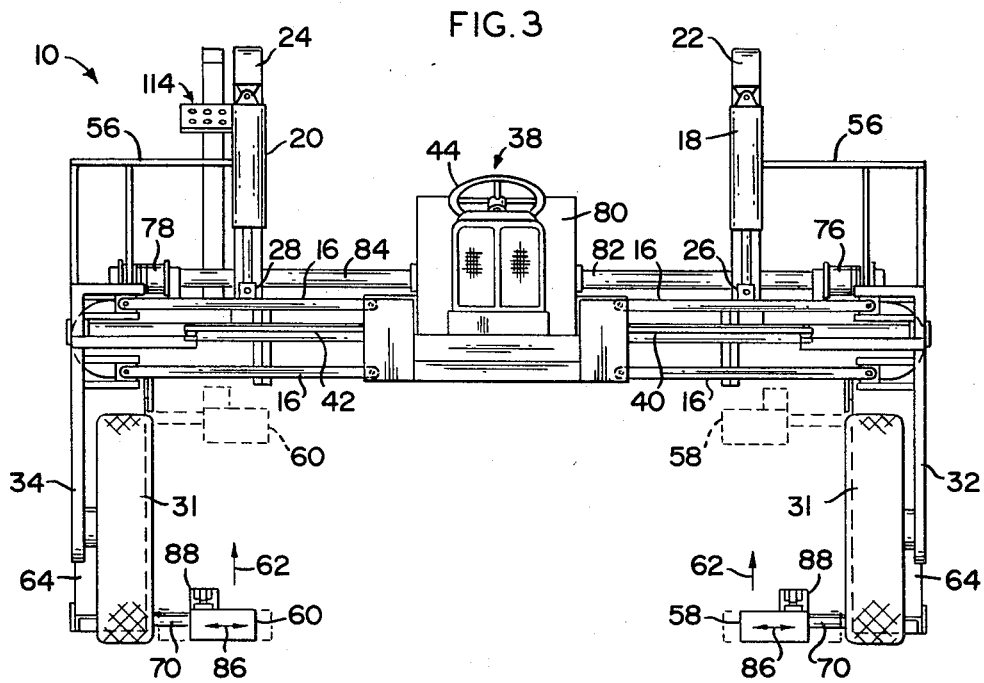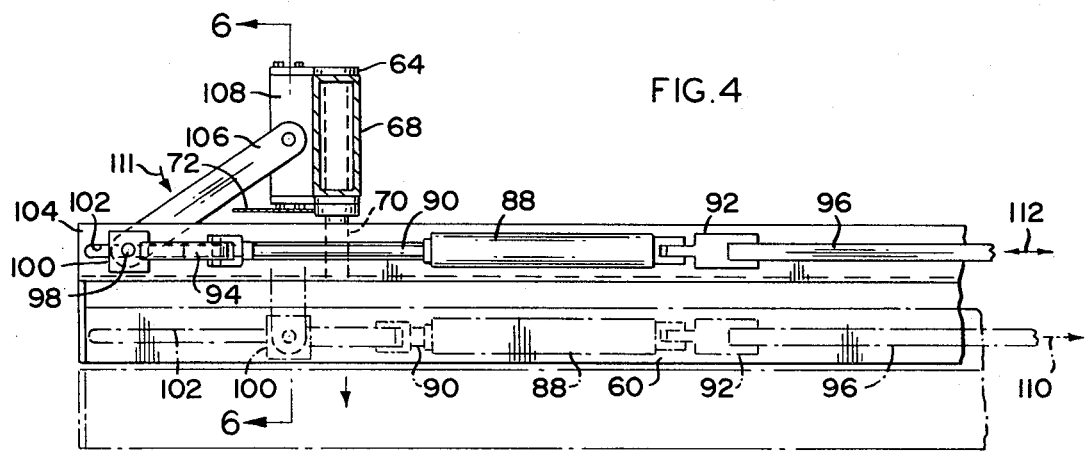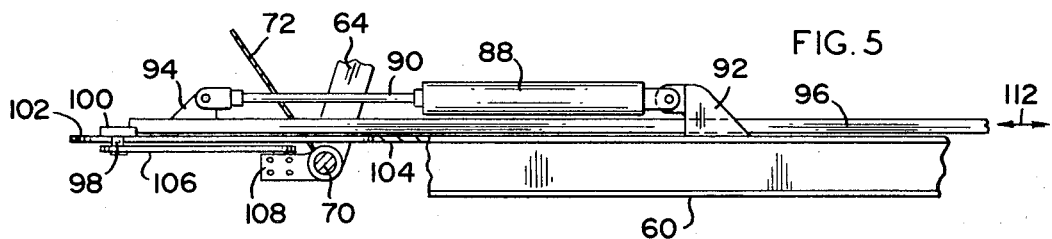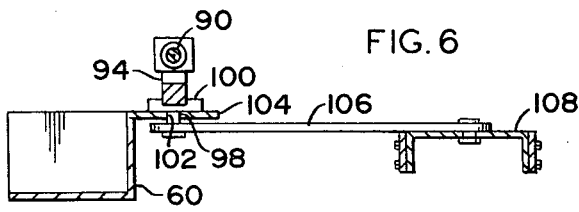

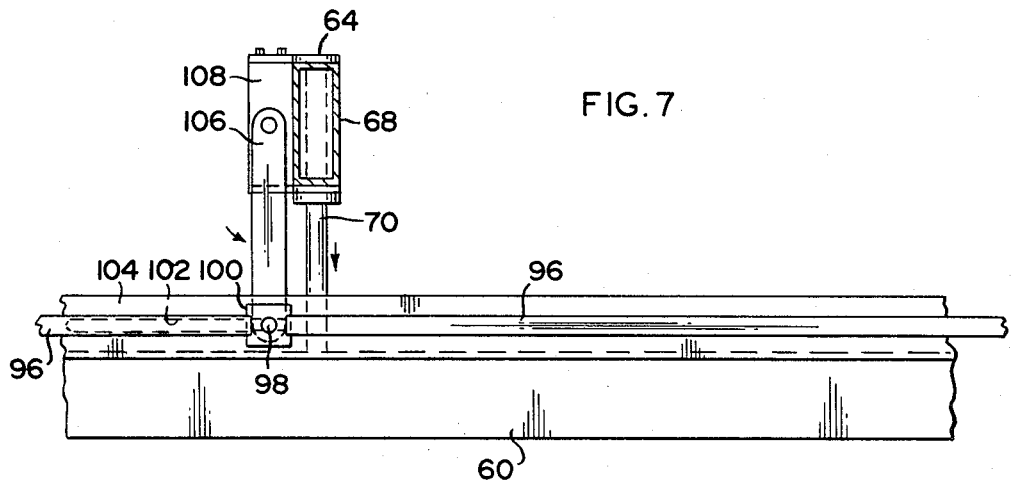
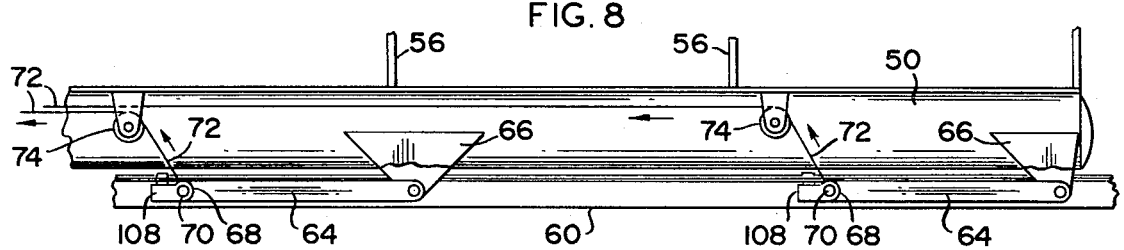
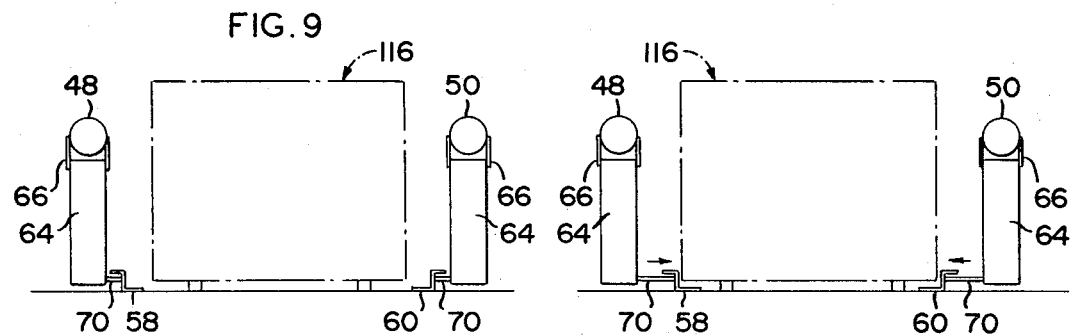
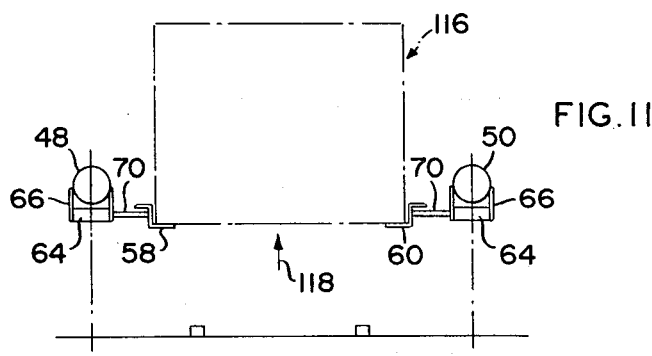
INVENTOR.
JOHN L. THIBODEAU SR.
BY Law Offices of
Stefan M. Stein
ATTORNEY.

PRIME MOVER

BACKGROUND OF THE INVENTION

1. Field of the Invention

A vehicle capable of transporting large loads, such as modular homes, including load engaging means capable of being moved in both a horizontal and vertical direction to engage and then lift the load.

Description of the Prior Art

Many vehicles exist which have been used to transport large loads such as modular homes. The majority of these comprise a flat bed with means thereon to secure the load to the bed during transportation. Since these vehicles are not specifically designed to carry modular homes a number of problems have arisen including loading and unloading inefficiency and safety during actual transportation of the load.

The recent popularity of modular homes has increased the need for adequate means to transport them, at least at the site of their manufacture, or at the site of their sale. Even such limited transportating needs have caused problems, perhaps the most serious being the need for additional machines or apparatus, such as heavy duty cranes, to lift the modular home onto the flat bed of the vehicle. Such load procedure is not only inefficient but also time consuming and frequently dangerous due to the large size and weight of the modular home.

SUMMARY OF THE INVENTION

The novel vehicle of this invention comprises a U-shaped bed specifically designed to horizontally enclose the lower end of the load.

A load engaging means, in the form of a track assembly, is connected to the frame and comprises two elongated track units each of which is movably connected to one of the legs of the frame. Each of the track units are designed to move in a horizontal and a vertical direction. This lends great versatility to the vehicle in that the frame is capable of handling various sizes of modular homes or similar type loads. Horizontal movement is accomplished by a horizontal adjusting means in the form of pneumatic or hydraulic cylinders associated with each of the track units. The cylinders force a plurality of link members, each of which are interconnected between a lift arm and a track unit to pivot in a horizontal plane. The track units are thereby moved towards or away from each other into supporting engagement with the lower longitudinal edges of the load. Once the track units properly engage the load, vertical positioning of the load is undertaken. Movement in the vertical direction is accomplished by a vertical positioning means in the form of a plurality of lift arms movably interconnected between each of the frame legs and its cooperating track unit. The lift arms are all simultaneously raised and lowered by means of a cable and pulley assembly. The cables are controlled by means of two power driven winches each of which is associated with the lift arms and track unit of a separate leg of the frame.

A plurality of control stations are located at various points on the frame of the vehicle. This allows an operator to position or adjust the load engaging means at a point where he can clearly observe the positioning of the load relative to the frame.

Motive force to transport the load is supplied to the vehicle from a conventional type tractor motor or the like which is mounted on a front portion of the vehicle frame. This front portion has leveling devices in the form of hydraulic piston and cylinder arrangements which maintain the bed portion of the vehicle substantially level regardless of the orientation of the front portion of the vehicle frame.

Accordingly, the vehicle of the present invention is capable of easy, rapid and efficient transporting of a modular home in that the load may be raised to the desired level on the frame of the vehicle. The vehicle of the present invention also has the power means needed to raise the load to the desired position which is separate from the power means utilized to drive the vehicle. This power comes from a separate power source which is small and lightweight enough to be mounted on the vehicle. Therefore the problems and expense in using separate machines to load the vehicle are eliminated.

In operation, the frame is positioned relative to the modular home to be loaded. This is accomplished by backing the frame about the load until the legs of the frame extend along the longitudinal sides of the load and are approximately equal distance from the corresponding sides. The adjusting means are then activated to horizontally move the track units inwardly towards each other and into engagement with the lower longitudinal edges of the load. Once the track units are secured in supporting relation to the load, the lift arm may be activated through operation of the pulley and cable assembly. Driving of the winches forces the lift arm associated with each of the legs to rotate into a substantially horizontal position. The track units are thereby simultaneously raised and the load is accordingly vertically positioned at a point most desirable for transporting of the load on the vehicle.

The invention accordingly comprises the features of construction, combination of elements and arrangements of parts which will be exemplified in the construction hereinafter set forth and the scope of the invention will be indicated in the claims.

BRIEF DESCRIPtION OF THE DRAWINGS

For a fuller understanding of the nature and objects of the invention, reference should be had to the following detailed description taken in connection with the accompanying drawings in which:

FIG. 1 is a top plan view of the vehicle of the invention.

FIG. 2 is a side elevational view.

FIG. 3 is a front elevational view.

FIG. 4 is a fragmentary top view of the adjusting means for the load engaging means.

FIG. 5 is a side view of the adjusting means of FIG. 4.

FIG. 6 is a sectional view taken along line 6—6 of the adjusting means of FIG. 4.

FIG. 7 is a detailed fragmentary top view of a portion of the load engaging means.

FIG. 8 is a fragmentary side view of the positioning means.

FIG. 9 is a schematic view showing the load in position to be engaged by the vehicle.

FIG. 10 shows the load engaging means being positioned with respect to the load.

FIG. 11 shows the load in raised position.

Similar reference characters refer to similar parts throughout the several views of the drawings.

DETAILED DESCRIPTION

The vehicle of the present invention is generally indicated as 10 in FIG. 1 and comprises a load supporting bed 12. A power source 14 in the front of the vehicle provides the motive force to the vehicle. Power source 14 in the form of a tractor or the like is mounted on support arms 16 which serve to support the tractor relative to the front wheels 31. hydraulic suspension cylinder and piston assemblies 18 and 20 serve to connect the front end of the bed 12 to the front portion of the frame, in suspended fashion by cooperation with support beams 22 and 24 respectively. The front portion of the frame is supported by tires 31, one set of which is mounted underneath the frame 16 by means of depending arms 32 and 34. A second set of tires 30 are mounted underneath bed 12 by means of a tire housing 36. Operation of the vehicle during the transporting of the load is conducted by an operator from a control area 38 also generally located on support arms 16. As shown in FIG. 3 a drive shaft 40 and steering linkage 42 are disposed adjacent control area 38 and serve to interconnect power source 14 and steering mechanism 44 respectively to the various wheels of the vehicle.

The bed 12 of the vehicle comprises a substantially U-shaped frame 46 designed to accommodate very large loads such as modular homes, trailers or the like. Frame 46 includes two elongated leg portions 48 and 50 arranged in spaced substantially parallel relation to one another. Each of the legs 48 and 50 include a walkway 52 and 54 respectively, extending the length of the leg. A guard rail 56 is provided around the periphery of each walkway such that an operator may walk the entire length of each leg to observe the loading and unloading of the load.

Load engaging means, in the form of a track assembly, is movably connected to frame 46. the track assembly comprises two track units 58 and 60 which are connected in movable relation to legs 48 and 50 respectively of frame 46. As shown in FIG. 6, each of the track units comprises an essentually L-shaped flange designed to engage in supporting relation the lower longitudinal edges of the load.

Each of the track units 58 and 60 are movable in a vertical direction as indicated by arrows 62 in FIG. 3. This vertical movement is accomplished by a vertical positioning means in the form of a plurality of lifting arms 64 mounted at spaced intervals along each leg 48 and 50. The upper leg of each arm 64 is pivotally connected to its respective leg by depending support plate 66. As shown in FIG. 2 and 4 the lower or opposite end of lifting arm 64 is pivotally connected to a track unit by means of a sliding connection comprising housing 68 and shaft 70. Shaft 70 is capable of movement along its own longitudinal axis and pivotally engages the track unit. Accordingly, the vertical position of each track unit may be varied by the lifting or rotation of lift arms 64. This rotation of lift arm 64 causes relative rotational movement between shafts 70 and the corresponding track unit to which they are connected.

The rotation of lift arms 64 is accomplished by means of a pulley and cable assembly comprising cable 72. The cables 72 are disposed adjacent the lower extremity of lift arms 64 and are connected through a plurality of pulleys 74 to two driven winches 76 and 78. FIG. 8 shows the track assembly in its highest vertical position wherein lift arms 64 are substantially horizontal with the ground. Each of the winches 76 and 78 are powered by means of a drive mechanism 80 serving to drive two driven shafts 82 and 84 which in turn are connected to winches 76 and 78 respectively. Rotation of drive shafts 82 and 84 in the desired direction causes the simultaneous movement of lift arm 64 and accordingly the raising or lowering of track units 58 and 60.

As indicated by directional arrows 86, in FIG. 3, the track units are also capable of movement toward and away from one another in a horizontal direction. As will be explained in greater detail later, this allows for the track units to be adjusted to the particular size of the load to be transported and lends great versatility to the vehicle. This horizontal movement is accomplished by horizontal adjusting means which comprises a pneumatic or hydraulic cylinder 88 cooperating with piston 90 mounted on each of the track units 58 and 60. For the sake of clarity, the piston and cylinder arrangement mounted on track unit 60 will be described. It should be noted however that each of the track units 58 and 60 have the equivalent cylinder and piston arrangement to be described with specific reference to FIGS. 4 and 5. One end of cylinder 88 is fixedly secured to the corresponding track unit by means of a bracket 92. One end of piston 90 is secured to shaft 96 by means of bracket 94. Shaft 96 is arranged to extend along the length of the track unit and is movable relative thereto along its own longitudinal axis. The end of shaft 96 cooperating with bracket 94 is connected to a pin 98 by means of square head 100. Pin 98 is arranged to slide within slot 102 formed in an upper flange 104 of each track unit. A link member 106 has one end movably connected to the lower portion of pin 98 as shown in FIG. 6. The opposite end of link member 106 is pivotally connected to flange 108 extending from the lower extremity of each lift arm 64.

Referring now to FIGS. 4 and 5, the horizontal movement toward or away from one another of track units 56 and 60 is accomplished by activating the cylinder and piston arrangement 88, 90. More specifically, when piston 90 is extended out of cylinder 88 the track units are in their innermost position, and furtherest away from one another. However, upon activation of the cylinder and piston arrangement, piston 90 may be drawn into cylinder 88. This causes movement of shaft 96 along its own longitudinal axis in the desired direction as indicated by arrow 110. As shaft 96 moves in this manner, pin 98 travels in the same direction along slot 102. This in turn causes link member 106 to rotate in a counter clockwise direction (arrow 111) and accordingly forces the corresponding track unit 60 outwardly away from the lift arm 64. Each of the track units is sufficiently supported from the plurality of cooperating lift arms 64 in that the shafts 70 are allowed to be drawn out of their housings 68 as mentioned above. The amount of horizontal travel allowed to each of the track unit is necessarily limited by the lengths of link members 106 and shafts 70 associated with each of the lift arms 64. Each of the track units may be moved inwardly towards lift arms 64 merely by the reverse operation. This comprises the forcing of piston 90 out of cylinder 88 and the rotation of link member 106 is a clockwise direction. Reciprocal movement of shaft 96 is indicated by directional arrows 112.

While the preferred embodiment as shown in FIGS. 1 and 2 include only a single cylinder and piston arrangement 88, 90 associated with each track unit 58 and 69, this invention is intended to encompass the embodiment wherein a plurality of cylinder and piston arrangements are mounted in cooperation with more than one lifting arm 64 on each of the track units. However, as shown in FIG. 7, the preferred embodiment of this invention merely has a link member 106 associated with the remaining lift arms 64 and connected to movable shaft 96 by means of pin 98 and locking head 100. Movement of shaft 96 along its own longitudinal axis causes the rotation of all link members 106 in the desired direction and the inward or outward movement of each of the track units. A similar cylinder and piston arrangement 68, 70 is mounted at the lower extremity of each lift arm 64 and cooperates with the respective track units as described above.

Both vertical and horizontal movement of the track assembly may be controlled at either one of the plurality of the control stations 114 and 115 mounted at different locations on the bed 12. Each of the control stations includes control means in the form of a panel capable of operating both the power driven winches 76, 78 and the fluid cylinders 88, 90 thereby regulating the exact position of track units 58 and 60.

Referring specifically to FIGS. 9, 10 and 11 the operation of the vehicle is as follows: the vehicle is positioned such that a modular home or like load 116 is partially enclosed between legs 48 and 50 of frame 46. The load engaging means in the form of track units 58 and 60 are then both moved in an horizontal direction towards each other until each of the track units are brought into a supporting relation to the load by engaging a lower longitudinal edge as shown in FIG. 10. Once the track unit 58 and 60 are properly positioned the load may be lifted or vertically positioned as indicated by arrow 118. As outlined above this is accomplished by the rotation of lift arms 64 to a point where the load 116 is at a vertically desirable position. The load then is properly positioned relative to bed 12 to transport the load to a desired location.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statement of the scope of the invention which, as a matter of language, might be said to fall therebetween.

Now that the invention has been described, What is claimed is:

1. A vehicle of the type designed to transport large loads such as modular homes said vehicle comprising: a frame in which the load is supported, load engaging means including a plurality of track units connected to said frame, adjusting means to adjust the size of said load engaging means such that it corresponds to the size of the load; positioning means connected to said frame such that said load engaging means may be vertically positioned relative to said frame, said adjusting means comprising at least one link member pivotally interconnected between said positioning means and each track unit, a shaft movably arranged along each of said track units, a piston and cylinder assembly disposed relative to each of said shafts on each of said track units such that said link member moves each track unit relative to one another upon movement of said shaft, whereby the position of each of said track units may be varied by actuation of said piston and cylinder assembly.

2. A vehicle as in claim 1 wherein said frame is substantially U-shaped and includes two longitudinally extending legs, each of said track units extending along the length of one of said legs, said adjusting means interconnected to both said frame and said tracks units so as to regulate the distance between said track units.

3. A vehicle as in claim 1 wherein said positioning means comprises a plurality of lift arms movably interconnected between said frame and said load engaging means, whereby the vertical position of the load may be varied to accomplish loading and transporting of said load.

4. A vehicle as in claim 3 wherein said frame is substantially U-shaped and includes a pair of longitudinally extending legs arranged in substantially parallel relation to one another, and a plurality of lift arms pivotally mounted along each of said legs; each of said lift arms connected to one of said track units in spaced relation to the remaining of said lift arms, whereby rotation of said lift arms causes vertical movement of said track units.

5. A vehicle as in claim 3 further comprising means to rotate said lift arms relative to said frame, said means including at least one winch mounted on said frame, a cable and pulley assembly interconnecting said lift arms to said winch such that the driving of said winch rotates said lift arms whereby the load engaging means is moved in a vertical direction.

6. A vehicle as in claim 1 wherein said adjustment mean includes at least one shaft movably disposed on each of said track units, at least one cylinder and piston assembly associated with each track unit, each of said cylinders fixedly secured to one of said track units, each of said pistons fixedly secured to one of said shafts such that relative movement between said piston and said cylinder causes movement of said track units relative to said frame.

7. A vehicle as in claim 1 wherein said frame includes at least two longitudinally extending legs arranged in spaced parallel relation to one another; said positioning means comprising a plurality of lift arms interconnected between each of said legs and its associated track unit, whereby movement of said lift arms causes vertical positioning of said track units; an adjusting means comprising a shaft movably connected to each track unit, a plurality of link members interconnecting said lift arms to said associated track unit, at least one piston and cylinder arrangement cooperating with each track unit, said piston being fixedly secured to said shaft and said cylinder being fixedly secured to the cooperating track unit, whereby movement of said piston relative to said cylinder causes movement of said track unit toward and away from one another.

* * * * *